United States Patent
Nett et al.

(10) Patent No.: US 9,694,662 B2
(45) Date of Patent: Jul. 4, 2017

(54) VEHICLE ELECTRIC AND MECHANICAL DRIVE TRAIN

(71) Applicant: GKN Driveline International GmbH, Lohmar (DE)

(72) Inventors: Hans-Peter Nett, Adenau (DE); Matthias Adelt, Bochum (DE); Klaus Matschker, Neunkirchen (DE); Michael Hock, Neunkirchen-Seelscheid (DE); Theo Gassmann, Siegburg (DE)

(73) Assignee: GKN Automotive Ltd., Redditch, Worcestershire (GB)

( * ) Notice: Subject to any disclaimer, the term of this patent is extended or adjusted under 35 U.S.C. 154(b) by 0 days.

(21) Appl. No.: 14/424,042

(22) PCT Filed: Aug. 27, 2013

(86) PCT No.: PCT/EP2013/067745
§ 371 (c)(1),
(2) Date: Feb. 26, 2015

(87) PCT Pub. No.: WO2014/033137
PCT Pub. Date: Mar. 6, 2014

(65) Prior Publication Data
US 2015/0224867 A1    Aug. 13, 2015

(30) Foreign Application Priority Data
Aug. 27, 2012 (DE) .................. 10 2012 107 889

(51) Int. Cl.
*B60K 6/48*    (2007.10)
*B60K 1/00*    (2006.01)
(Continued)

(52) U.S. Cl.
CPC .................. *B60K 6/48* (2013.01); *B60K 1/00* (2013.01); *B60K 6/387* (2013.01); *B60K 6/52* (2013.01);
(Continued)

(58) Field of Classification Search
CPC ... B60K 6/20; B60K 6/38; B60K 6/40; B60K 6/48; B60K 2006/4808
See application file for complete search history.

(56) References Cited

U.S. PATENT DOCUMENTS 1,853,058 A * 4/1932 Johnson ................... B60K 6/24
                                                        180/242
3,211,249 A * 10/1965 Papst ....................... B60K 5/04
                                                        180/65.25
(Continued)

FOREIGN PATENT DOCUMENTS

DE         199 54 544       * 8/2001  ............... B60K 6/02
DE     102007037758 A1      3/2009
(Continued)

OTHER PUBLICATIONS

International Preliminary Report on Patentability for PCT/EP2013/067745 dated Mar. 3, 2015 (10 pages).
(Continued)

*Primary Examiner* — Frank Vanaman
(74) *Attorney, Agent, or Firm* — Bejin Bieneman PLC (57) ABSTRACT

A mechanical and electric drive train of a motor vehicle having an internal combustion engine and an electric motor, includes a conventional drive train which is driven by the internal combustion engine, an electric motor drive train which is driven by an electric motor, a shift gearbox arranged in the conventional drive train, and at least one axle drive unit for driving axle drive members which are connected or are connectable via a clutch to driving wheels of
(Continued)

at least one axle of the motor vehicle. The electric motor drive train is connected between the shift gearbox and the axle drive members to the drive train via at least one first clutch device, wherein the connection can be produced and eliminated by actuation of the first clutch device.

14 Claims, 5 Drawing Sheets (51) Int. Cl.
*B60K 6/387* (2007.10)
*B60K 6/52* (2007.10)
B60K 17/344 (2006.01)
B60K 23/04 (2006.01)

(52) U.S. Cl.
CPC ...... *B60K 17/344* (2013.01); *B60K 2001/001* (2013.01); *B60K 2006/4808* (2013.01); *B60K 2023/043* (2013.01); *Y02T 10/626* (2013.01); *Y02T 10/6221* (2013.01); *Y02T 10/6265* (2013.01); *Y10S 903/951* (2013.01)

(56) References Cited

U.S. PATENT DOCUMENTS

| | | | | |
|---|---|---|---|---|
| 4,335,429 A | * | 6/1982 | Kawakatsu | B60K 6/387 180/65.23 |
| 4,405,029 A | * | 9/1983 | Hunt | B60K 6/24 180/303 |
| 5,558,589 A | * | 9/1996 | Schmidt | B60K 6/48 475/5 |
| 5,669,842 A | * | 9/1997 | Schmidt | B60K 6/365 180/65.25 |
| 2001/0042647 A1 | * | 11/2001 | Sakamoto | B60K 6/442 180/65.23 |
| 2002/0040818 A1 | * | 4/2002 | Maruyama | B60K 6/48 180/65.25 |
| 2002/0065163 A1 | * | 5/2002 | Deichl | B60K 6/40 475/5 |
| 2003/0234124 A1 | * | 12/2003 | Pecnik | B60K 6/26 180/65.25 |
| 2006/0169505 A1 | * | 8/2006 | Adamis | B60K 6/387 180/65.225 |

FOREIGN PATENT DOCUMENTS

| | | |
|---|---|---|
| DE | 102008029287 A1 | 12/2009 |
| DE | 102010048857 A1 | 4/2012 |
| DE | 102010054871 A1 | 6/2012 |
| DE | 102011053832 A1 | 3/2013 |
| GB | 2455062 A | 6/2009 |
| JP | 2007127145 A | 5/2007 |
| JP | 2009078751 A | 4/2009 |

OTHER PUBLICATIONS

International Search Report dated Oct. 30, 2013 with translation (8 pages).

* cited by examiner

VEHICLE ELECTRIC AND MECHANICAL DRIVE TRAIN

CROSS-REFERENCE TO RELATED APPLICATIONS

This application is a National Phase of, and claims priority to, International Application No. PCT/EP2013/067745 filed on Aug. 27, 2013, which claims priority to German Application No. DE 10 2012 107 889.0 filed on Aug. 27, 2012, each of which applications are hereby incorporated by reference in their entireties.

BACKGROUND

A mechanical and electric drive train of a hybrid vehicle is known from DE 10 2011 053 832 A1. In this drive train, an internal combustion engine and an electric motor are coupled to the drive wheels. The internal combustion engine and the electric motor are connected to a common input shaft of the gearbox wherein the gearbox transmits the power of one or both motors to an axle of the vehicle.

The disadvantage of the known drive train is that, firstly, an electric motor and an internal combustion engine must be arranged on one side of the gearbox, so that typically, there must be space for both motors in one engine compartment. A further disadvantage is that both motors are connected via the gearbox to the drive shafts of the driven axle so that this drive train is barely able to be configured for purely electric motor operation, since in this case, the gearbox is not necessary. The electric motor would thus have to drive the gearbox which would lead to unnecessary losses. For this reason, the known drive train is provided only for supportive electric motors wherein the motor vehicle is substantially driven by the internal combustion engine.

A further mechanical and electric drive train of a hybrid vehicle of this type is known from DE 10 2007 037 758 A1. In this drive train, the internal combustion engine and the electric motor are also arranged before the gearbox, so that this drive train also has the same disadvantage as that described above.

The drive train of a motor vehicle typically consists of the components which transmit the force of the drive motor or, if a plurality are present, of the drive motors, to the drive shafts of the driven axle or axles. In the first place, in the case of an internal combustion engine-powered motor vehicle, this is the shift gearbox which is connected to the engine via an automatic or mechanical clutch by which the driver can select various transmission ratios (gears).

It is also usual, but not essential, that a power transmission unit (PTU), by which the drive force is transmitted from the output shaft of the gearbox either directly to a differential or to a propeller shaft is arranged behind the shift gearbox. If the power transmission unit acts directly on the differential, both gearbox units can also be arranged in one common housing.

In the case of power transmission by means of a propeller shaft, a further gearbox (drive unit) is typically arranged at the end of this propeller shaft as an axle drive unit, by which the drive force is distributed to the drive shafts of the driven axle.

SUMMARY

The disclosure relates to a mechanical and electric drive train of a motor vehicle having an internal combustion engine and an electric motor, and comprising a conventional drive train which is driven by the internal combustion engine, an electric motor drive train which is driven by an electric motor, a shift gearbox arranged in the conventional drive train and at least one axle drive unit for driving axle drive members which are connected or connectable via a clutch to drive wheels of at least one axle of the motor vehicle. The invention further relates to a motor vehicle having such a mechanical and electric drive train.

Accordingly, disclosed herein is a mechanical and electric drive train for a motor vehicle and a motor vehicle with a mechanical and electric drive train which enables both operation of the electric motor supporting the internal combustion engine and also purely electric operation with the highest possible efficiency. This advantage is achieved in that the electric motor drive train is connected to the drive train between the shift gearbox and the axle drive members by at least one clutch device, wherein the connection can be created and released by actuation of the first clutch device.

The present disclosure is not restricted either to a front-wheel drive or to a rear-wheel drive, but rather can be used in conjunction with both drive concepts and also with an all-wheel drive. According to the invention, in addition to a common part or general drive train, the drive train has an electric motor drive train and a conventional drive train. As with every vehicle having an internal combustion engine, the conventional drive train connects the internal combustion engine to the gearbox and, subsequently, connects the gearbox via the common part of the drive train, to the power output. The electric motor drive train also connects the electric motor to the power output.

The individual partial drive trains, specifically the electric motor drive train and the conventional drive train, as well as the common drive train, can be brought together at any desired position of the drive train, and usually this takes place in the region of the axle drive unit or shortly therebefore or thereafter.

The present disclosure is based on a modular drive concept for the motor vehicle. The motor vehicle is, in particular, a passenger vehicle with a mechanical and electric axle wherein this axle can be either the rear axle or the front axle, or both axles can be driven by the drive train. Examples will now be described with emphasis placed on a rear wheel drive although, in the case of a front wheel drive, similar mechanisms can be used both for the case that the engine is installed at the front and for the case that the engine is arranged in the middle or in the rear of the vehicle.

The disclosed subject matter can be used with common or independent alternative operation of the two drive concepts firstly of "internal combustion engine" and secondly of "electric motor". It can be suitable in principle to use optionally one of the two motors or to use both motors. This can be due to very different reasons.

Thus, for example, the internal combustion engine can be used to accelerate the vehicle to a desired basic speed whereas the electric motor is subsequently used to keep the vehicle at this speed. This function is commonly known as the "coasting function". Furthermore, the electric motor can naturally also be used to drive purely by electric motor power to reduce environmental pollution, provided sufficient energy reserves can be provided by the battery. Finally, the electric motor can also be used in recuperation mode as a generator for re-charging the battery. At the same time, however, the internal combustion engine can also be used exclusively for drive power.

The disclosed subject matter is designed to make all these operating modes available with the smallest possible losses. Possible arrangements include a front-wheel drive (meFWD=mechanical-electric front wheel drive), rear-wheel drive (meRWD=mechanical-electric rear wheel drive) or all-wheel drive (meAWD=mechanical-electric all-wheel drive).

A core piece of the drive train is the mechanically and/or electrically drivable axle drive unit, in particular as a both mechanically and electrically drivable distribution unit with an axle gearbox, by which the vehicle forward power output is distributed to both the drive wheels of one axle or a plurality of axles.

In the following, examples will be described in greater detail by reference to such an axle drive unit for the rear axle, specifically a mechanical-electric axle drive unit (meRDU=mechanical-electric rear drive unit).

According to the underlying concept, the electric motor can be coupled to drive members of an axle drive unit, in particular to an axle gearbox such as a differential and, by the provision of suitable clutch devices, a plurality of different drive modes. With these drive modes, particular sections or components of the drive train can be specifically switched in or out or used for temporary auxiliary functions.

The drive elements of the electric motor drive train section are driven exclusively by an electric motor to transmit a vehicle propulsive power or, in particular drive modes, particularly in recuperation operation, starting from the main drive train, following, which does not however contribute to the transmission of the vehicle propulsive power. The drive elements of the internal combustion engine drive train section are driven exclusively by an internal combustion engine to transmit the vehicle propulsive power, although they can naturally follow in particular drive modes by the wheels rolling on the road, for example, to use a braking function of the engine while traveling on hills. Furthermore, drive modes can be provided in which drive elements of the internal combustion engine drive train section uncoupled from the internal combustion engine are made to follow by the electric motor, which however in both cases also does not serve to transmit the vehicle propulsive power.

Drive elements of the electric motor-powered drive train section can be in form-fitting power-transmitting engagement with drive members arranged in the common drive train, for example, at the axle drive unit or the drive shafts, or cooperate frictionally therewith. The form-fitting or frictionally engaging power-transmitting connection between the respective drive elements of the electric motor drive train and of the common drive train can take place via a differential housing or via a drive element of the common drive train connected to or at least cooperating with the differential housing or other drive members of the axle drive. This can be, for example, a form-fitting or frictionally engaging clutch unit, a toothed gear connected rotationally fixed to the differential housing or an input shaft or output shaft of the axle drive unit.

An engagement pairing or frictional pairing enables the introduction of electric motor power into drive elements of the axle drive unit, in particular the direct introduction of electric motor power into drive elements of the axle gearbox of the axle drive unit without a further drive element of the main drive train section which does not belong to the axle drive unit being connected therebetween.

In the electric motor drive train section, in an embodiment, a first clutch device is provided for switching the electric motor drive in or out, by which the power-transmitting connection between the electric motor and the axle drive unit formed by the engagement pairing or frictional pairing can be released directly or indirectly. Thus, with the clutch device closed, a drive element of the electric motor drive train section is in power-transmitting connection with a drive element of the axle drive unit.

With the clutch device open, this connection is released. The connection is directly released if the drive members of the electric motor drive train which are in engagement with the drive elements of the common drive train are themselves part of the decoupling device. The connection is indirectly released if the drive elements of the electric motor drive train which are in engagement with the drive elements of the common drive train are arranged downstream of the first clutch device, seen in the direction of the drive power flow, and thus despite releasing of the power-transmitting operative connection, continue to rotate but without transmitting power because the engagement or frictional pairing in the direct transition from the electric motor drive train to the internal combustion engine drive train still exists.

In the common drive train or in the internal combustion engine drive train, a second clutch device can be provided for switching the conventional drive train in and out. In the event that with the possibility of switching off the electric drive train, a first clutch device is already provided, the second clutch device represents an additional clutch device by which the internal combustion engine drive can also be decoupled from the axle drive unit and from the electric motor drive train section.

As an alternative or in addition to the second clutch device, one or more further clutch devices can be provided in the common drive train, by which the drive wheels of the vehicle (wheels that serve to drive the vehicle forward in at least one drive mode) can be uncoupled from the common drive train, in particular from the axle drive. These clutch devices can be, for example, individually drivable friction clutches of a differential-free axle drive.

In an embodiment, the mechanical, conventional drive train and/or the electric drive train can be disconnected via, in each case, a frictional or form-fitting clutch element for differential disconnection. A first clutch element serves for switching the electric drive train in and out, while a second clutch element serves for switching the conventional drive train in and out.

For the switching out of the conventional drive train, the axle drive unit has a multi-part differential housing with an input housing having a drive wheel, in particular a crown wheel, and an output housing having a differential gearbox. A second clutch element is provided, by which the input housing and the output housing can be connected in form-fitting manner or frictionally in order to transmit internal combustion engine vehicle propulsion power by means of the axle drive unit to drive wheels connected to the axle drive unit. The second clutch element can also replace the above-described switching out of the conventional drive train or can function as such.

The clutch element can alternatively or additionally serve for coupling the input housing with the output housing and, if required, can couple a drive element of the electric motor drive train to the output housing. The clutch element can thus also serve as a switching-out device for the electric motor drive train or can take over this function.

It is particularly advantageous if the clutch element is configured such that, depending on the setting, it is optionally able to decouple or couple the electric motor drive train section from/to the common drive train (function of switching out the electric motor drive train) or the internal combustion engine drive train section from/to the main drive train section (function of switching out the conventional drive train) or both the electric motor drive train and the internal combustion engine drive train from/to the common drive train. In the latter case, all three drive train sections are coupled to one another.

BRIEF DESCRIPTION OF THE DRAWINGS

Further features and advantages of the invention are disclosed in the subclaims and the following description making reference to the drawings, in which:

DETAILED DESCRIPTION OF THE DRAWINGS

Figure 1:
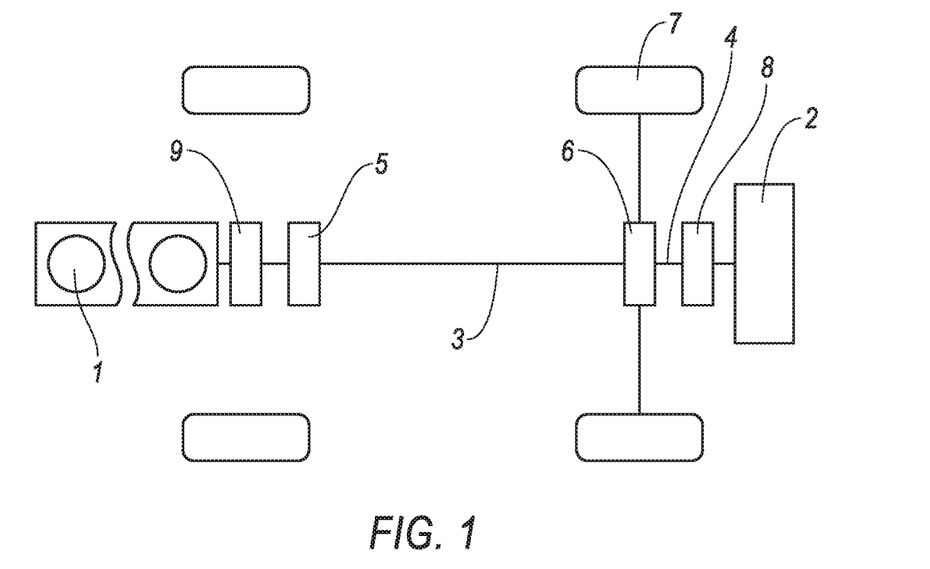
FIG. 1 is a schematic representation of the exemplary components of a drive train.

FIG. 1 shows schematically a drive train of a motor vehicle illustrating components of embodiments discussed herein.

The vehicle, in this case, is rear-wheel driven with drive wheels 7. It has an electric motor 2 and an internal combustion engine 1, wherein the internal combustion engine 1 is connected by a second clutch device 9 to a conventional drive train 3. The conventional drive train 3 also has a shift gearbox 5.

The electric motor 2 is connected via an electric motor drive train 4 to a rear axle drive unit 6 which distributes the drive force to the drive wheels 7. Interposed between the electric motor 2 and the axle drive unit 6 is a first clutch device 8 for switching the electric motor drive train 4 in or out. In this case, the front wheels are not driven.

An advantage is that the common drive train has two inputs, specifically one input for the conventional drive train 3 for providing a force flow with the internal combustion engine 1 and a further input for the electric motor drive train 4 for providing a force flow with the electric motor 2. At least the input for the electric motor drive train 4 is switchable via the first clutch device 8. Preferably, the second input for the conventional drive train 3 is also switchable via a clutch.

Figure 2:
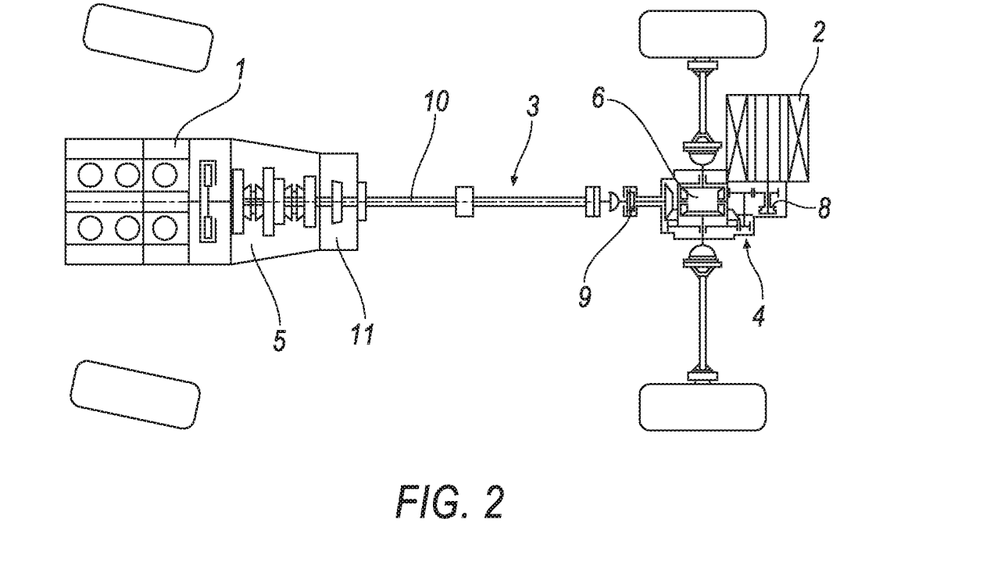
FIG. 2 is a drive train similar to the drive train of FIG. 1 in a more detailed view.

FIG. 2 shows an exemplary embodiment very similar to the exemplary embodiment of FIG. 1 in a more detailed representation. This involves a rear-wheel driven vehicle with a longitudinally mounted internal combustion engine 1. The overall drive train of this exemplary embodiment comprises a conventional drive train 3, an electric motor drive train 4 and a common drive train, wherein the drive power is transmitted via the common drive train to the drive wheels 7.

The common drive train has an axle drive unit 6 which distributes the force of the internal combustion engine 1 and/or of the electric motor 2 to the drive shafts of the driven axle. The internal combustion engine 1 is connected via a propeller shaft 10, which is part of the conventional drive train 3, to the axle drive unit 6. A shift gearbox 5 and a power transmission unit 11, which connects the output shaft of the shift gearbox 5 to the propeller shaft 10 are connected therebetween.

In the embodiment shown, the motor vehicle has a front-mounted engine as the internal combustion engine 1. The electric motor 2 is mounted transversely in the rear region of the motor vehicle. The electric motor 2 is connected via a first clutch device 8 to the electric motor drive train 4, which then creates the force flow to the axle drive unit 6.

The advantage is that, independently of one another, the electric motor drive train 4 can be connected to the axle drive unit 6 via the first clutch device 8 and, additionally, the conventional drive train 3 can be connected to the axle drive unit 6 via the second clutch device 9.

Through the selective coupling in or out of the conventional drive train 3 and/or of the electric motor drive train 4, each of the two motors can now optionally be put into use. Alternatively, both motors can be used in order to drive, for example, with the internal combustion engine but nevertheless to be able to use the starting torque of the electric motor 2.

A further advantage is that drive trains which are not needed can also be switched out to prevent frictional losses. Depending on the purpose of use and the particular case, a more or less large part of the drive train can be put out of action. In the exemplary embodiment shown in FIG. 2, the first clutch device 8 and the second clutch device 9 are arranged close to the axle drive unit 6, so that when the internal combustion engine 1 is put out of action, the propeller shaft 10 is also uncoupled so that same is not driven by the moving rear axle.

Where and how the first clutch device 8 and the second clutch device 9 are arranged and whether further clutch devices are possibly provided, for example, before the shift gearbox 5 or behind the shift gearbox 5, depends on the purpose of use of the drive train. Some exemplary embodiments which make clear the multiplicity of the possible uses and sites of use of the clutch devices will now be described.

Firstly, the purpose of the use of a drive train according to embodiments disclosed herein and of a motor vehicle equipped therewith will be described in greater detail making reference to FIG. 2, considering different modes.

The drive train considered is a rear axle drive with a longitudinal mounting. The axle drive unit 6 (RDU) of the rear axle transmits the torque from the internal combustion engine 1 via a right-angle gear drive. The rotary speed compensation between the two rear drive wheels 7 is enabled via a differential within the axle drive unit 6. In addition, an electric motor 2 is provided which can transmit torque via a reduction stage to a differential housing of the axle drive unit 6. Furthermore, the first clutch element 8 is implemented for uncoupling the electric drive train and the second clutch element 9 is implemented between a pinion and a connection of the propeller shaft 10 for uncoupling the mechanical drive train into the axle drive unit 6.

In internal combustion engine operating mode, the rear drive wheels 7 are driven by the internal combustion engine 1 (conventional drive train 3). The electric motor 2 is switched off and is separated by means of the switching-out unit of the first clutch device 8 from the common drive train.

In the purely electric operating mode, the internal combustion engine 1 is switched off. The switching-out unit realized by the second clutch device 9 at the input of the axle drive unit 6 is opened so that the internal combustion engine 1, the shift gearbox 5 and the propeller shaft 10 stand still. The first clutch device 8 is closed so that torque can be transmitted to the rear drive wheels 7 from the electric motor 2. By this means a purely electric drive mode is achieved. This drive mode can also support the coasting function in the coasting mode, which is described below, through short torque injections.

In the combined mode (boost mode), the rear drive wheels 7 are driven by means of the internal combustion engine 1. The electric motor is engaged via the closed first clutch device 8 and can additionally introduce torque into the drive train ("boosting").

In the recuperation mode, the internal combustion engine 1 is switched off. The switching-out unit of the second clutch device 9 in the axle drive unit 6 (RDU) is opened. However, the switching-out unit of the first clutch device 8 is closed. During driveless rolling of the vehicle, the electric motor 2 is used as a generator in order to charge the battery using the kinetic energy of the freewheeling vehicle.

In "coasting mode", the internal combustion engine 1 and the electric motor 2 are switched off. Both clutch devices 8, 9 of the axle drive unit 6 are open. The vehicle can now roll (coast) along the roadway with lower resistance in the drive train. For the prolonging of the coasting mode, a combination with the electric operating mode is possible. Short-term acceleration impulses by means of the electric motor 2 would compensate for resistive losses such as rolling resistance and air resistance and would thus bring about a prolonged coasting capability.

Figures 3, 4, 5, 6:
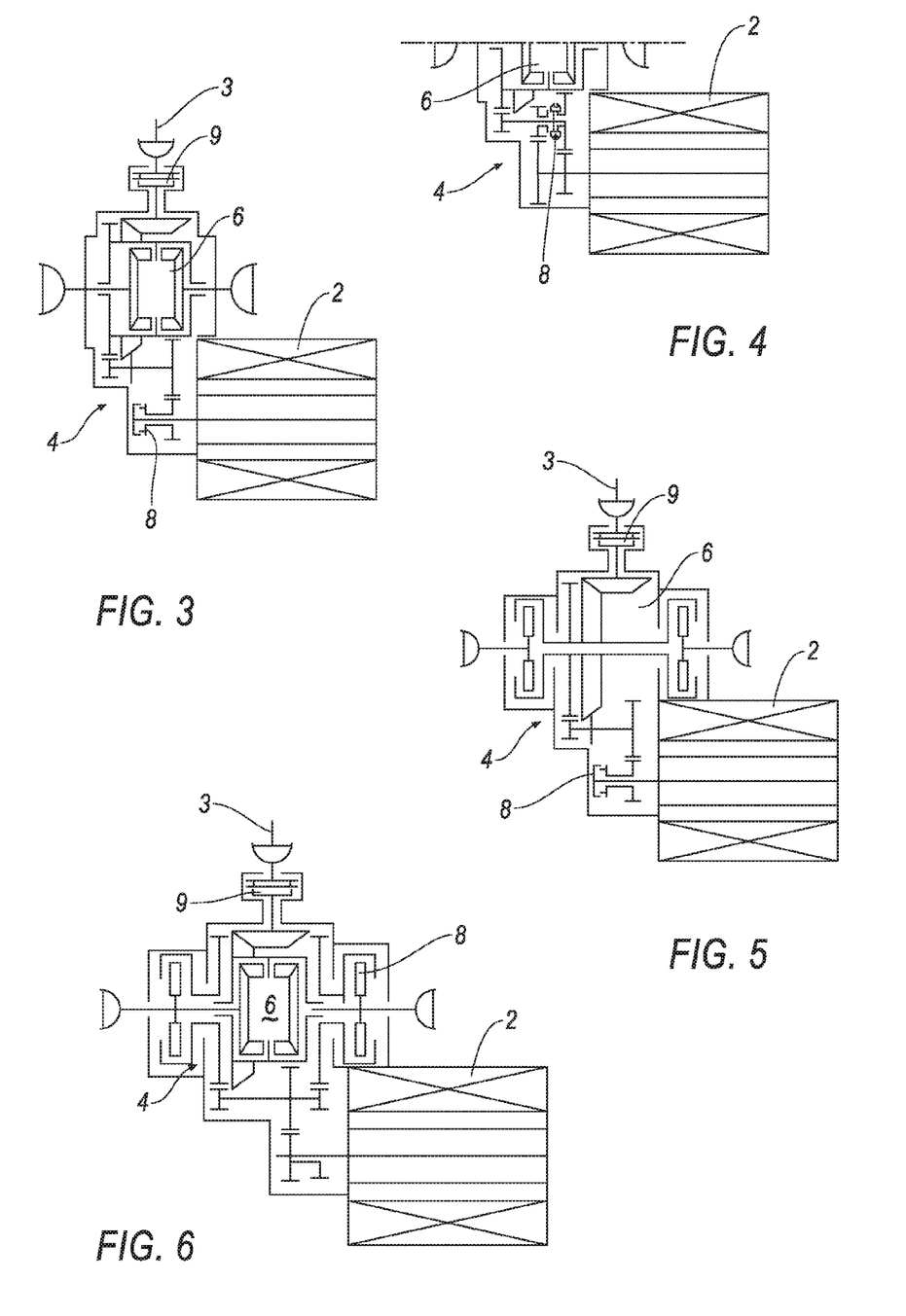
FIG. 3 is a force flow diagram of a further embodiment in the region of the axle gearbox.
FIG. 4 is an enlarged representation of the region of the axle gearbox of FIG. 3.
FIG. 5 is a force flow diagram of a fourth embodiment in the region of the axle gearbox.
FIG. 6 is a force flow diagram of a fifth embodiment in the region of the axle gearbox.

FIG. 3 shows a force flow diagram of an embodiment, which substantially corresponds to the embodiment of FIG. 2.

The force of the electric motor 2 is transmitted to the axle drive unit 6 by means of the first clutch device 8 within the electric motor drive train 4 which additionally has a reduction stage behind the first clutch device 8.

The force of the internal combustion engine 1 (not shown here) is also transmitted via the conventional drive train 3 and the second clutch device 9 to the axle drive unit 6.

The force of the electric motor 2 is transmitted to the differential of the axle drive unit 6 by means of a reduction gearbox and the first clutch device 8 within the electric motor drive train 4. By use of the first clutch device 8 and the second clutch device 9, the electric motor drive train 4 and/or the conventional drive train 3 can each be disengaged from or engaged with the axle drive unit 6.

FIG. 5 shows a modification of the drive train of FIG. 3. The torque from the conventional drive train 3 and the electric motor drive train 4 is individually distributed (by torque vectoring) by means of two regulable lamella clutches (not shown) to the drive wheels 7. In addition, the lamella clutches serve to disengage the axle to the drive wheels 7. As a result of this disengagement function, the switching-out unit of the mechanical drive train 3 could be dispensed with so that, in this case, a purely electric drive mode with a disengaged conventional drive train 3 is not possible.

The switching-out unit of the conventional drive train 4 can alternatively also be placed at the output of the shift gearbox 5.

FIG. 4 shows the region of the axle drive unit 6 of the embodiment shown in FIG. 3 in an enlarged representation. The first clutch device 8 for coupling to the electric motor drive train 4 is shown. The clutch device 8 is arranged as a clutch in front of the reduction gearbox. The reduction gearbox is configured here as a two-speed gearbox. Alternatively, the clutch device 8 can be configured form-fitting or frictional.

FIG. 6 shows portions of a further embodiment of a drive train.

The torque from the internal combustion engine drive is transmitted by means of a right-angle drive and a differential of the axle drive unit 6 to the two drive wheels 7. In the conventional drive train 3, as in the embodiment described above, the second clutch device 9 is provided.

The torque of the electric motor drive is individually distributed, by use of two regulable lamella clutches which function in this case as a first clutch device 8, to the drive wheels 7 (electric torque vectoring). The lamella clutches also serve here for disengaging the electric drive. Due to this disengaging function, other switching-out units for the electric motor drive train 4 can be dispensed with.

The second clutch device 9 can herein also be a form-fitting or frictional clutch.

Figure 7:
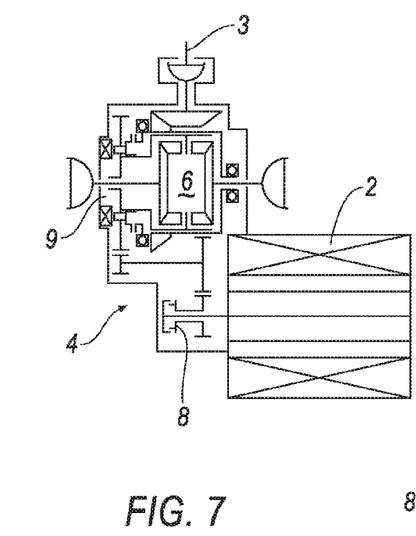
FIG. 7 is a force flow diagram of a sixth embodiment in the region of the axle gearbox.

FIG. 7 shows a variant of the drive train with a differential switching-out unit. The electric motor 2 is herein also connected via the first clutch device 8 and a reduction gearbox to the axle drive unit 6 which in this case has a differential.

The torque from the conventional drive train 3 is distributed by means of the right-angle drive and the differential to the drive wheels 7. The differential housing is configured in two parts. By means of a clutch element, the outer part on which the crown wheel is mounted can be connected to or disengaged from the inner part which comprises the inner differential elements such as pinion gears and side gears. The electric motor 2 transmits torque via the reduction stage to the inner differential housing and can itself be disengaged at the motor output by means of the first clutch device 8.

Figure 8:
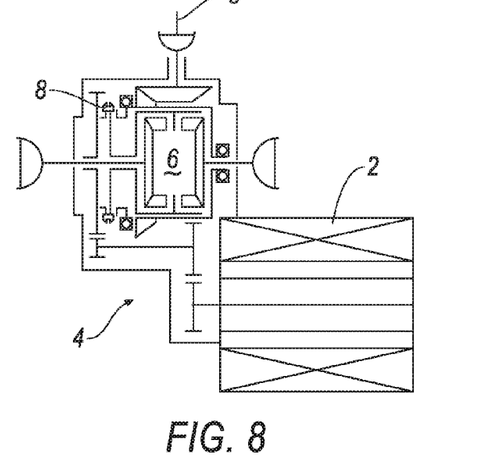
FIG. 8 is a force flow diagram of a seventh embodiment in the region of the axle gearbox.

FIG. 8 shows a further variant of a drive train. The torque from the conventional drive train 3 is distributed to the drive wheels 7 by use of the right-angle drive and a differential. The differential housing is herein also configured in two parts, wherein the outer part on which the crown wheel is mounted can again be connected to or disengaged from the inner part which comprises the inner differential elements such as pinion gears and side gears, by means of a clutch element.

In addition, the electric motor drive train 4 can be connected by means of the same clutch element to the inner differential housing. Therefore, by use of the clutch element on the differential housing which has three switching positions, the electric motor drive train 4 or the conventional drive train 3 can be coupled to the inner differential part. An altered mechanical construction of the clutch elements leading to other coupling variants for the three switching settings is also conceivable.

Figure 9:
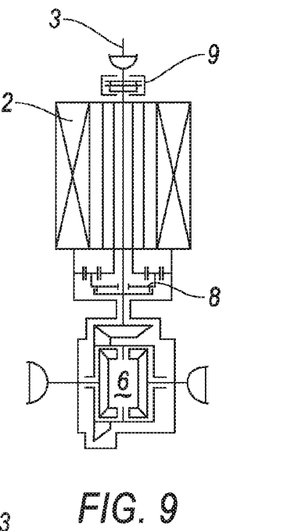
FIG. 9 is a force flow diagram in the region of the axle gearbox with an alternative arrangement of the electric motor.

FIG. 9 shows a possible variant of the position of the electric motor 2. Herein the electric motor 2 is not arranged transversely and behind the axle drive unit 6, but between the internal combustion engine 1 and the axle drive unit 6. Irrespective of the axle gearbox variant, the electric motor 2 can be differently positioned:

Transverse installation: The electric motor 2 is herein installed parallel or coaxially to the side shafts, as in the embodiment according to FIGS. 3, 5, 6, 7 and 8. The torque can be fed in via a crown wheel stage or a planetary stage.

Longitudinal installation: The electric motor 2 is herein installed parallel or coaxially to the propeller shaft 10. This variant is shown in FIG. 9. Herein also, the torque can be fed in via a crown wheel stage or a planetary stage. In a second embodiment of this variant, the electric motor 2 can also be installed such that the axle compensation unit, in particular the differential, is arranged between the propeller shaft 10 and the electric motor 2. The torque is then fed via an additional pinion into the existing right-angle drive of the conventional drive train 3 (variant not shown).

Figure 10:
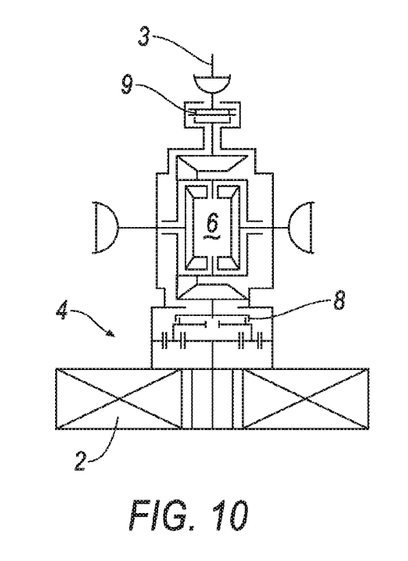
FIG. 10 is a force flow diagram of an eighth embodiment in the region of the axle gearbox.
Figure 11:
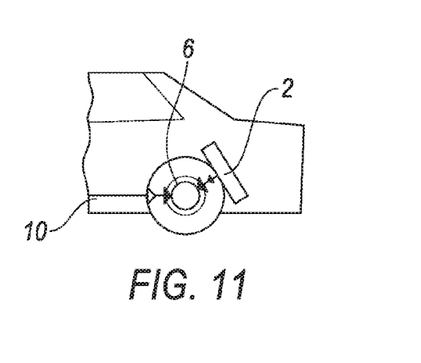
FIG. 11 is a spatial representation of the position of the electric motor according to the eighth embodiment according to FIG. 10.

Horizontal installation: The electric motor 2 is herein installed horizontally (for example, 90° to the propeller shaft 10) or angled (relative to the propeller shaft 10). The torque can herein be fed via an additional pinion into the existing right-angle drive of the conventional drive train 3. This variant is shown in FIG. 10 and FIG. 11.

The variants 2 and 3 have the advantage that the reduction stage of the electric motor drive train 4 can be smaller since the gearing of the right-angle drive can also be used for the electric motor drive train 4.

Figure 12:
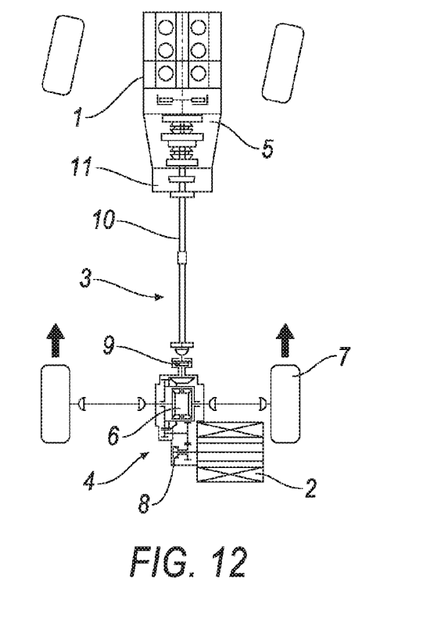
FIG. 12 is a first usage concept in conjunction with a rear-wheel drive vehicle and a longitudinally mounted engine.

In FIGS. 12 to 15, uses of the disclosed subject matter with different vehicle concepts are shown in a comparative overview:

FIG. 12 substantially shows the embodiment that was described above.

Figure 13:
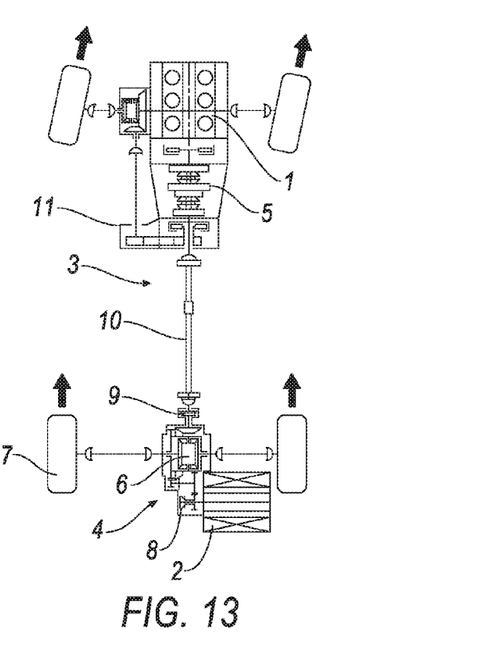
FIG. 13 is a second usage concept in conjunction with an all-wheel drive vehicle and a longitudinally mounted engine.

FIG. 13, however, shows in a direct comparison to the embodiment described above, an embodiment with an all-wheel drive. Herein, the front axle is also driven by means of the power transmission unit 11.

Figure 14:
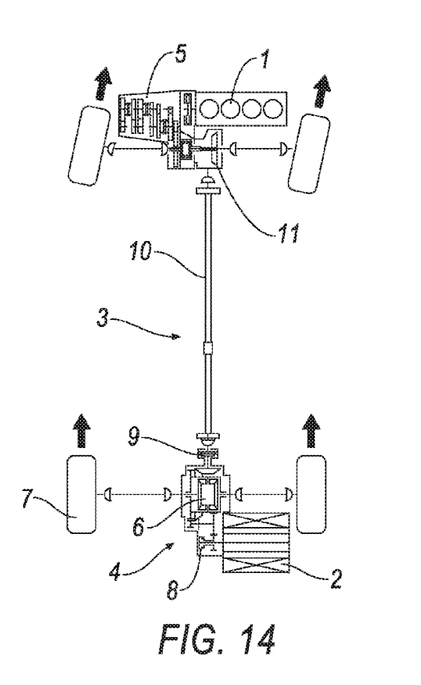
FIG. 14 is a third usage concept in conjunction with a rear-wheel drive vehicle and a transversely mounted engine.
Figure 15:
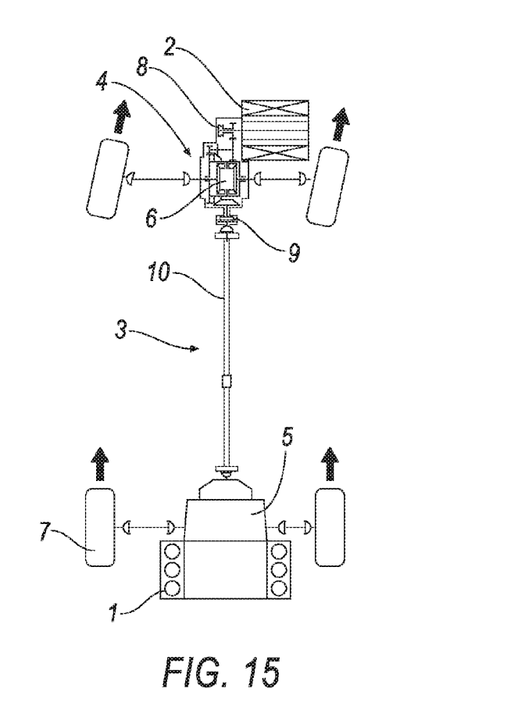
FIG. 15 is a fourth usage concept in conjunction with a rear-wheel drive vehicle and a rear or mid-engine.

FIG. 14 shows a very similar embodiment, the difference being that the motor/gearbox unit is installed transversely in the region of the internal combustion engine 1 and the shift gearbox 5 in the embodiment according to FIG. 14, whereas in the embodiment according to FIG. 13, it is installed longitudinally.

The function of the all-wheel drive will now be described in greater detail based on the embodiment of FIG. 14.

Herein also, the drive train consists of the power transmission unit 11 (PTU) at the output of the shift gearbox 5 and a mechanical-electric two-clutch axle drive unit 6 (meRDU). By use of the power transmission unit 11, torque is transmitted from the internal combustion engine 1 via the propeller shaft 10 to the axle drive unit 6 (conventional drive train 3). The conventional drive train 3 to the rear drive wheels 7 can be disengaged from the internal combustion engine 1 (or the shift gearbox 5) by use of a second clutch device 9.

By use of the electric motor 2 situated at the axle drive unit 6 and a reduction stage, torque can be transmitted to the rear drive wheels 7 (electric motor drive train 4). The torque to the drive wheels 7 is not transmitted as usual by use of a differential, but by using two clutches. Apart from the required torque distribution (torque vectoring), the clutches assume the differential compensation function and, if needed, the disengagement of the rear axle to the drive wheels 7.

In both cases (FIGS. 13 and 14), the front axle is driven by the front power transmission unit 11. As FIG. 13 shows, a further clutch is provided preferably within the power transmission unit 11 or between the shift gearbox 5 and the power transmission unit 11, so that the propeller shaft 10 can optionally be decoupled at the axle drive unit 6 or at this further clutch. In this way, even in the purely electric motor operating mode, all-wheel drive can be realized. It is obvious that, if relevant, the further clutch as well as the second clutch device 9 can be used for disengaging the conventional drive train 3, so that the clutch shown in FIG. 13 close to the axle drive unit 6 could be dispensed with.

Finally, the arrangement and number of the clutches is a design matter and it is at the discretion of the designer which components he wishes to disengage in which operating mode.

Figure 16:
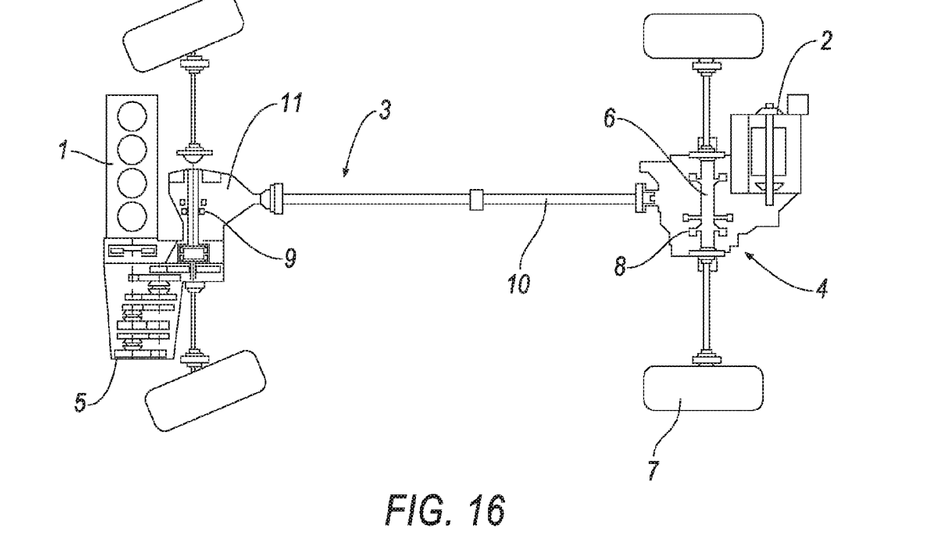
FIG. 16 is the drive train of an all-wheel drive motor vehicle with switching out of the conventional drive train at the shift gearbox output.

FIG. 16 shows an embodiment of the axle drive with a transversely installed internal combustion engine 1 and a transversely installed shift gearbox 5 in an enlarged representation. This embodiment substantially corresponds to the overview of FIG. 14. In this case, the switching-out of the conventional drive train 3 takes place at the shift gearbox output. This involves the drive train of a mechanical/electric all-wheel drive with a differential-free clutch-controlled compensation unit.

The drive train consists of the power transmission unit 11 at the output of the shift gearbox and a mechanical and electric two-clutch axle drive unit 6 (meRDU). By means of the power transmission unit 11, torque is transmitted from the internal combustion engine 1 via the propeller shaft 10 to the axle drive unit 6 (conventional drive train 3). The conventional drive train 3 to the rear drive wheels 7 can herein also be disengaged from the internal combustion engine 1 (or the shift gearbox 5) by means of a second clutch device 9.

By use of the electric motor 2 situated at the axle drive unit 6 and the reduction stage, torque can be transmitted to the rear drive wheels 7 as described above (electric motor drive train 4). The torque to the drive wheels 7 is here also not transmitted as usual by means of a differential, but by means of two clutches. Apart from the required torque distribution (torque vectoring), the clutches take on the differential compensation function and, if needed, the disengagement of the rear axle to the drive wheels.

Figure 17:
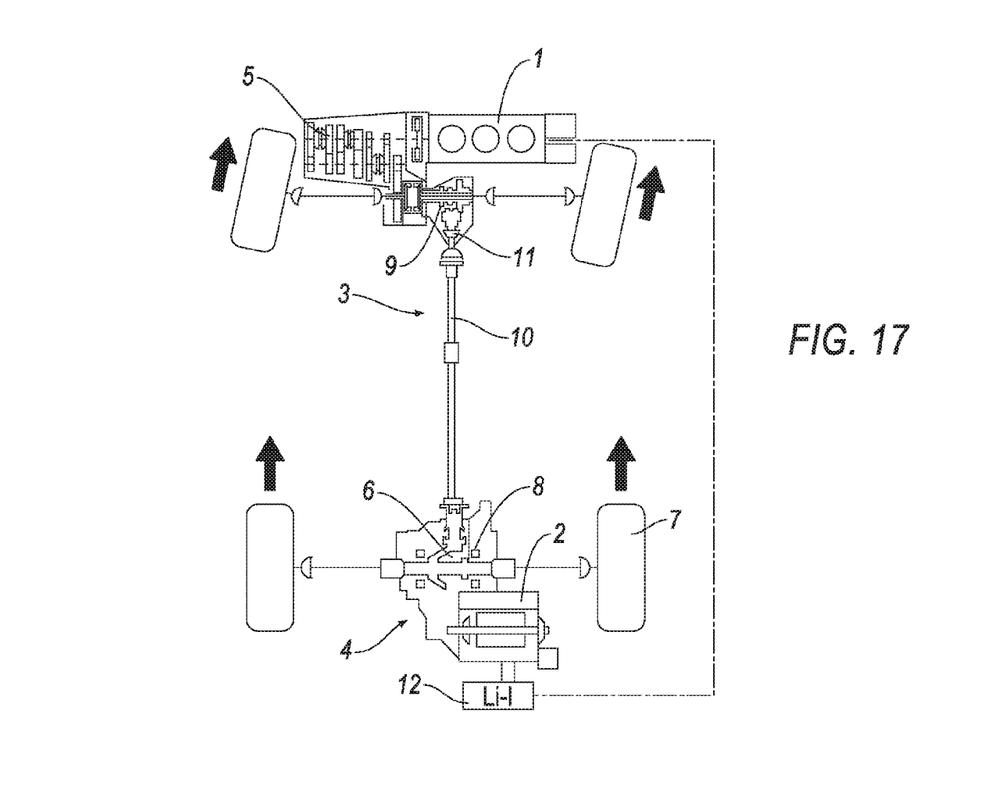
FIG. 17 is the drive train of a motor vehicle with a device for extending the range (range extender).

FIG. 17 shows a drive train with a differential-free clutch-controlled compensation unit and range extension for the electric motor drive ("range extender mode").

The range extension is carried out by recharging the battery 12 by means of the additional generator connected to the internal combustion engine 1. This generator can charge the battery 12. The electric motor 2 can thus be used more often. The power output of the internal combustion engine 1 can be reduced since the power that is lacking can be compensated for by switching in the electric motor 2.

The different embodiments of the drive train according to the invention as described above show the multiplicity of possible combinations of the fundamental inventive concept that the common drive train has two inputs for the conventional drive train 3 and the electric motor drive train 4, wherein the inputs can be switched selectively by using clutches.

The invention claimed is:

1. A motor vehicle having an internal combustion engine and an electric drive motor and a vehicle drive train connecting the engine and the electric drive motor to drive wheels, the vehicle drive train comprising:
an engine drive train exclusively driven by the internal combustion engine when transmitting propulsive power;
an electric motor drive train exclusively driven by the electric drive motor when transmitting propulsive power;
a common drive train selectively drivingly connected to:
the engine drive train when it is transmitting propulsive power, and
the electric motor drive train when it is transmitting propulsive power;
an axle drive unit arranged to drive axle drive members that are connected or connectable via a clutch to drive wheels of the vehicle drive train, the axle drive unit including:
a pinion rotatably mounted in the axle drive unit,
a first toothed gear drivingly engaged by the pinion,
a part of the common drive train comprising a drive member rotatably disposed within the axle drive unit and having the first toothed gear fixed thereto, and
the electric drive motor is located at the axle drive unit;
a first clutch device comprising part of the electric motor drive train and disposed between and selectively drivingly connecting the electric drive motor and the drive member; and a second clutch device comprising part of the engine drive train and disposed between and selectively drivingly connecting the pinion and a remainder of the engine drive train between the pinion and the internal combustion engine,
wherein the second clutch device selectively drivingly connects the pinion with a propeller shaft of the engine drive train and the toothed gear is a crown wheel and the electric motor is rigidly fixed to the axle drive unit, and the drive member is a differential housing and a first of the axle drive members is a first side gear in the differential housing and a second of the axle drive members is a second side gear in the differential housing.

2. The drive train of claim 1, wherein a second toothed gear is fixed to the differential housing and is selectively engaged with the electric drive train by the first clutch device.

3. The drive train of claim 2, wherein the first clutch is disposed between the second toothed gear and the electric drive motor.

4. The drive train of claim 2, wherein the electric motor drive train includes a first countershaft rotatably disposed between an output shaft of the electric drive motor and the second toothed gear and the first clutch is disposed on the countershaft and is selectively engageable with a first countershaft gear and a second countershaft gear.

5. A vehicle drive train for a motor vehicle having an internal combustion engine and an electric drive motor, the vehicle drive train comprising:
an engine drive train exclusively driven by the internal combustion engine when transmitting propulsive power;
an electric motor drive train exclusively driven by the electric drive motor when transmitting propulsive power;
a common drive train selectively drivingly connected to:
the engine drive train when it is transmitting propulsive power, and
the electric motor drive train when it is transmitting propulsive power;
an axle drive unit arranged to drive axle drive members that are connected or connectable via a clutch to drive wheels of the vehicle drive train, the axle drive unit including:
a pinion rotatably mounted in the axle drive unit,
a first toothed gear drivingly engaged by the pinion,
a part of the common drive train comprising a drive member rotatably disposed within the axle drive unit and having the first toothed gear fixed thereto, and
the electric drive motor is located at the axle drive unit;
a first clutch device comprising part of the electric motor drive train and disposed between and selectively drivingly connecting the electric drive motor and the drive member; and a second clutch device comprising part of the engine drive train and disposed between and selectively drivingly connecting the pinion and a remainder of the engine drive train between the pinion and the internal combustion engine,
wherein the second clutch device selectively drivingly connects the pinion with a propeller shaft of the engine drive train and the toothed gear is a crown wheel and the electric motor is rigidly fixed to the axle drive unit, and the drive member is a differential housing and a first of the axle drive members is a first side gear in the differential housing and a second of the axle drive members is a second side gear in the differential housing.

6. The drive train of claim 5, wherein a second toothed gear is fixed to the differential housing and is selectively engaged with the electric drive train by the first clutch device.

7. The drive train of claim 6, wherein the first clutch is disposed between the second toothed gear and the electric drive motor.

8. The drive train of claim 6, wherein the electric motor drive train includes a first countershaft rotatably disposed between an output shaft of the electric drive motor and the second toothed gear and the first clutch is disposed on the countershaft and is selectively engageable with a first countershaft gear and a second countershaft gear.

9. A motor vehicle having an internal combustion engine and an electric drive motor and a vehicle drive train connecting the engine and the electric drive motor to drive wheels, the vehicle drive train comprising:
an engine drive train exclusively driven by the internal combustion engine when transmitting propulsive power;
an electric motor drive train exclusively driven by the electric drive motor when transmitting propulsive power;
a common drive train selectively drivingly connected to:
the engine drive train when it is transmitting propulsive power, and
the electric motor drive train when it is transmitting propulsive power;
an axle drive unit arranged to drive axle drive members that are connected or connectable via a clutch to drive wheels of the vehicle drive train, the axle drive unit including:
a pinion rotatably mounted in the axle drive unit,
a first toothed gear drivingly engaged by the pinion,
a part of the common drive train comprising a drive member rotatably disposed within the axle drive unit and having the first toothed gear fixed thereto, and
the electric drive motor is located at the axle drive unit;
a first clutch device comprising part of the electric motor drive train and disposed between and selectively drivingly connecting the electric drive motor and the drive member; and a second clutch device comprising part of the engine drive train and disposed between and selectively drivingly connecting the pinion and a remainder of the engine drive train between the pinion and the internal combustion engine, wherein a second toothed gear is fixed to the drive member and is selectively engaged with the electric drive train by the first clutch device.

10. The drive train of claim 9, wherein the first clutch is disposed between the second toothed gear and the electric drive motor.

11. The drive train of claim 9, wherein the electric motor drive train includes a first countershaft rotatably disposed between an output shaft of the electric drive motor and a second toothed gear rigidly fixed to the drive member for unitary rotation therewith and the first clutch is disposed on the countershaft and selectively engageable with a first countershaft gear and a second countershaft gear.

12. A vehicle drive train for a motor vehicle having an internal combustion engine and an electric drive motor, the vehicle drive train comprising:
   an engine drive train exclusively driven by the internal combustion engine when transmitting propulsive power;
   an electric motor drive train exclusively driven by the electric drive motor when transmitting propulsive power;
   a common drive train selectively drivingly connected to:
      the engine drive train when it is transmitting propulsive power, and
      the electric motor drive train when it is transmitting propulsive power;
   an axle drive unit arranged to drive axle drive members that are connected or connectable via a clutch to drive wheels of the vehicle drive train, the axle drive unit including:
      a pinion rotatably mounted in the axle drive unit,
      a first toothed gear drivingly engaged by the pinion,
      a part of the common drive train comprising a drive member rotatably disposed within the axle drive unit and having the first toothed gear fixed thereto, and
      the electric drive motor is located at the axle drive unit;
   a first clutch device comprising part of the electric motor drive train and disposed between and selectively drivingly connecting the electric drive motor and the drive member; and a second clutch device comprising part of the engine drive train and disposed between and selectively drivingly connecting the pinion and a remainder of the engine drive train between the pinion and the internal combustion engine,
   wherein a second toothed gear is fixed to the drive member and is selectively engaged with the electric drive train by the first clutch device.

13. The drive train of claim 12, wherein the first clutch is disposed between the second toothed gear and the electric drive motor.

14. The drive train of claim 12, wherein the electric motor drive train includes a first countershaft rotatably disposed between an output shaft of the electric drive motor and a second toothed gear rigidly fixed to the drive member for unitary rotation therewith, and the first clutch is disposed on the countershaft and selectively engageable with a first countershaft gear and a second countershaft gear.

* * * * *